United States Patent
Kroninger et al.

(10) Patent No.: US 6,639,919 B2
(45) Date of Patent: Oct. 28, 2003

(54) BIT-LEVEL CONTROL FOR DYNAMIC BANDWIDTH ALLOCATION

(75) Inventors: Robert S. Kroninger, Wake Forest, NC (US); Dieter H. Nattkemper, Raleigh, NC (US); Paul Fitch, Raleigh, NC (US); Larry Grant Giddens, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1 day.

(21) Appl. No.: 09/846,919

(22) Filed: May 1, 2001

(65) Prior Publication Data

US 2002/0163936 A1 Nov. 7, 2002

(51) Int. Cl.⁷ ................................................. H04J 15/00
(52) U.S. Cl. ..................................................... 370/464
(58) Field of Search ................................ 370/464–478, 370/493, 438–444, 907, 390–394, 401–414, 347–349, 453–459, 352, 395, 461–465, 310, 328–342, 519; 707/202; 455/466, 515, 562, 426–430

(56) References Cited

U.S. PATENT DOCUMENTS

| | | |
|---|---|---|
| 3,678,268 A | 7/1972 | Reim et al. |
| 3,987,660 A | 10/1976 | Pelanne |
| 4,679,191 A | 7/1987 | Nelson et al. |
| 4,680,205 A | 7/1987 | Lerner et al. |
| 4,703,478 A | 10/1987 | Haselton et al. |
| 5,115,431 A * | 5/1992 | Williams et al. ............ 370/394 |
| 5,185,736 A | 2/1993 | Tyrrell et al. |
| 5,351,239 A | 9/1994 | Black et al. |
| 5,455,946 A * | 10/1995 | Mohan et al. ............... 707/202 |
| 5,463,629 A | 10/1995 | Ko |
| 5,493,328 A | 2/1996 | Kroninger et al. |
| 5,517,500 A | 5/1996 | White et al. |
| 5,524,007 A | 6/1996 | White et al. |
| 5,576,874 A | 11/1996 | Czerwiec et al. |
| 5,621,773 A | 4/1997 | Varma et al. |
| 5,648,958 A | 7/1997 | Counterman |
| 5,648,984 A | 7/1997 | Kroninger et al. |
| 5,687,014 A | 11/1997 | Czerwiec et al. |
| 5,818,843 A | 10/1998 | Virdee et al. |
| 5,841,772 A | 11/1998 | Daniel et al. |
| 5,848,068 A | 12/1998 | Daniel et al. |
| 5,920,561 A | 7/1999 | Daniel et al. |
| 5,953,318 A | 9/1999 | Nattkemper et al. |
| 5,978,374 A | 11/1999 | Ghaibeh et al. |
| 5,978,375 A | 11/1999 | Petersen et al. |
| 5,982,749 A | 11/1999 | Daniel et al. |
| 5,999,518 A | 12/1999 | Nattkemper et al. |
| 6,009,106 A | 12/1999 | Rustad et al. |
| 6,047,006 A | 4/2000 | Brakefield et al. |
| 6,049,541 A | 4/2000 | Kerns et al. |
| 6,078,568 A | 6/2000 | Wright et al. |
| 6,081,536 A | 6/2000 | Gorsuch et al. |
| 6,088,337 A | 7/2000 | Eastmond et al. |
| 6,108,306 A | 8/2000 | Kalkunte et al. |
| 6,128,301 A | 10/2000 | Bernstein |
| 6,137,294 A | 10/2000 | Best et al. |
| 6,167,095 A | 12/2000 | Furukawa et al. |
| 6,188,690 B1 | 2/2001 | Holden et al. |

* cited by examiner

*Primary Examiner*—Kwang Bin Yao
*Assistant Examiner*—Prenell Jones
(74) *Attorney, Agent, or Firm*—Fogg and Associates, LLC; Scott V. Lundberg

(57) ABSTRACT

Methods for bit-level control of dynamic bandwidth allocation are adapted for use in multi-node channelized transport systems. A single status bit is used to indicate the desired allocation status of each transport channel for which dynamic allocation is permitted or desired. The status bit has a first logic level indicative of a desire to have a first allocation status, such as allocated for data traffic, and a second logic level indicative of a desire to have a second allocation status, such as allocated for voice traffic. The status bit may be repeated multiple times within a frame to mitigate the effects of transmission errors. The values of the status bit or bits can be maintained across node boundaries without regard to the framing mechanisms or multiplexing techniques used by the transport system, thus permitting dynamic bandwidth allocation beyond the local loop.

37 Claims, 4 Drawing Sheets

BIT-LEVEL CONTROL FOR DYNAMIC BANDWIDTH ALLOCATION

TECHNICAL FIELD OF THE INVENTION

The present invention relates generally to bandwidth allocation between voice and data traffic in a telecommunications transport system, and in particular to bit-level control for dynamic bandwidth allocation in a channelized digital network transport system.

BACKGROUND OF THE INVENTION

Transport protocols have been defined to carry both traditional Pulse Code Modulated (PCM) voice traffic as well as packetized data traffic. Within such protocols, it is desirable to dynamically allocate the bandwidth of the transport channel between the voice and data traffic as a function of the voice activity. In general, protocols to handle dynamic bandwidth assignment between the voice and data traffic have been message-based systems. In a message-based system, one end sends a message through an overhead channel to the other end to coordinate changes in bandwidth allocation.

There are drawbacks to message-based control of bandwidth allocation between voice and data traffic. Messages can be lost and/or corrupted in transmission. When a message is lost, the two ends become out of sync as to how to allocate the bandwidth. To overcome this problem, message-based systems often employ methods such as acknowledgements, repeating of messages and periodic maintenance messages to assure that both ends are in agreement as to the bandwidth allocation.

Another issue with message-based systems concerns the speed at which the message can be transferred to affect a change in bandwidth allocation. Standards specify time limits for how long it can take to set up a voice channel after a signaling event, e.g., a subscriber line going off-hook. Standards may allow only 50 ms between the signaling event and the time the channel must be available for voice traffic. Depending on the bandwidth of the message channel, a change in bandwidth allocation may not meet the 50 ms deadline. Even if the bandwidth of the message channel is sufficient, the channel may be shared with other applications that may create added delay for queuing of the message before transmission.

Another example of dynamic bandwidth allocation is described in U.S. Pat. No. 6,009,106 issued Dec. 28, 1999 to Rustad et al. Rustad et al. describe a method for allocating bandwidth between switched (voice) traffic and unswitched (data) traffic over a T1 line using ESF (Extended Superframe) robbed bit signaling. The switched traffic uses its assigned DS0 (digital signal level 0) within the T1 while the switched channel is active. When the switched channel is inactive, the unswitched traffic uses the DS0 that is assigned to the switched channel. The basic premise for the control of the bandwidth allocation is to steal the 'C' bit in the ABCD signaling information and replace it with a dynamic allocation control bit. The 'C' bit can be used in this way since with ESF signaling the 'C' bit is always the same as the 'A' bit. In this manner, the proper signaling information can be recreated once the dynamic bandwidth control information has been retrieved.

When one end of the T1 transport system detects a change in status of the switched channel (for example going from inactive to active), the 'C' bit value is changed. The data being carried in the DS0 assigned to the switched channel is not changed until the start of the next ESF superframe. At the receiving end, the change in the 'C' bit value is detected, and the receiving end then knows that on the next superframe boundary the data being carried in the DS0 will change.

While there is benefit to the dynamic bandwidth allocation described in Rustad, et al., Rustad et al. admit that their invention is limited to transmission over a local loop. They note that it is normally inadvisable to utilize the ABCD bits when transmitting data over switched channels across multiple nodes of a telecommunication system. This is because it is possible for frames to be disassembled from one multiframe and reassembled into another multiframe during transmission across a node. As a result, the frames that contain robbed-bit signaling would change during transmission and the relationship between the frame and the robbed bits may be lost.

For the reasons stated above, and for other reasons stated below that will become apparent to those skilled in the art upon reading and understanding the present specification, there is a need in the art for alternative systems and methods for dynamically allocating bandwidth of transport channels between voice and data traffic in a multi-node network environment.

SUMMARY

Methods for bit-level control of dynamic bandwidth allocation are adapted for use in multi-node transport systems without regard to the framing mechanisms and multiplexing techniques used by the various nodes in the network. A single status bit is used to indicate the desired allocation status of each channel for which dynamic allocation is permitted or desired. The status bit has a first logic level indicative of a desire to have a first allocation status, such as allocated for voice traffic, and a second logic level indicative of a desire to have a second allocation status, such as allocated for data traffic. The status bit may be repeated multiple times within a frame to mitigate the effects of transmission errors. Spacing the repeated status bits within the frame further mitigates the effects of burst errors. Dynamic bandwidth allocation for multiple channels can be supported by using a separate status bit for each channel.

The status bit or bits are carried within a transport channel, such as a control channel, distinct from the channel(s) subject to dynamic allocation, such as one or more message channels. Message channels can carry voice and/or data traffic depending on the allocation status. In this manner, the values of the status bits can be maintained across node boundaries without regard to the framing mechanisms or multiplexing techniques used by the transport system. A restriction for crossing multiple nodes is that the framing structure support a method which maintains the relationship between the control channel and the message channel(s). The timing relationship must be maintained such that the control and message data be kept in the same frame as the traffic passes through multiple nodes. Also, the spatial relationship must be maintained such that the relationship between the control bits and the message channels they control is preserved as the traffic passes through multiple nodes. The various embodiments described herein thus permit dynamic bandwidth allocation beyond the local loop.

For one embodiment, the invention provides a method of dynamically allocating bandwidth in a multi-node transport system. The method includes detecting a condition indicative of a desire to change an allocation status for a first transport channel (e.g., a message channel) of the transport system, wherein detecting the condition occurs during transmission of a first frame from a first node to a second node of the transport system. The method further includes updating a status bit in a second transport channel (e.g., a control channel) in a second frame for transmission from the first node to the second node. The method still further includes changing the allocation status of the first transport channel in a third frame for transmission from the first node to the second node. The third frame is subsequent to the second frame and each frame carries channel traffic for the first transport channel and the second transport channel. For further embodiments the roles of the first node and the second node are reversed.

For another embodiment, the invention provides a method of dynamically allocating bandwidth in a multi-node transport system having at least a first transport channel (e.g., a message channel) associated with a subscriber line and a second transport channel (e.g., a control channel) distinct from the first transport channel. The method includes detecting a subscriber line condition indicative of a desire to change an allocation status for the first transport channel in an upstream direction from a first node to a second node of the transport system, wherein detecting the subscriber line condition occurs during transmission of a first frame in the upstream direction. The method further includes updating status bit information in the second transport channel in a second frame for transmission in the upstream direction and changing the allocation status for the first transport channel in a third frame for transmission in the upstream direction. The method still further includes evaluating, at the second node, the updated upstream status bit information from the second frame and updating status bit information in the second transport channel in a fourth frame for transmission in a downstream direction from the second node to the first node. The method still further includes changing the allocation status for the first transport channel in a fifth frame for transmission in the downstream direction.

For yet another embodiment, the invention provides a communications transport system for carrying a first traffic type (e.g., voice) and a second traffic type (e.g., data) between a first node and a second node. The transport system includes a carrier for transmitting frames between the first node and the second node, wherein the carrier has at least one first transport channel (e.g., a message channel) and a second transport channel (e.g., a control channel) distinct from each of the first transport channels and wherein each frame carries a sample of each of the first transport channels and the second transport channel. Each frame carries a status bit in the second transport channel corresponding to each of the first transport channels and each status bit is indicative of a desired allocation status for its corresponding first transport channel.

For a further embodiment, the invention provides a method of processing channel traffic in a telecommunications transport system having at least one first transport channel (e.g., a message channel) and a second transport channel (e.g., a control channel) distinct from each of the first transport channels. The method includes receiving a frame containing a sample of the channel traffic from each of the first transport channels and the second transport channel, wherein the second transport channel carries status bit information indicative of a desired allocation status for each of the first transport channels. The method further includes processing the samples of the channel traffic from each of the first transport channels according to their desired allocation status indicated by the status bit information carried by the second transport channel in an earlier received frame.

Further embodiments of the invention include apparatus and methods of varying scope.

DETAILED DESCRIPTION

Figure 1:
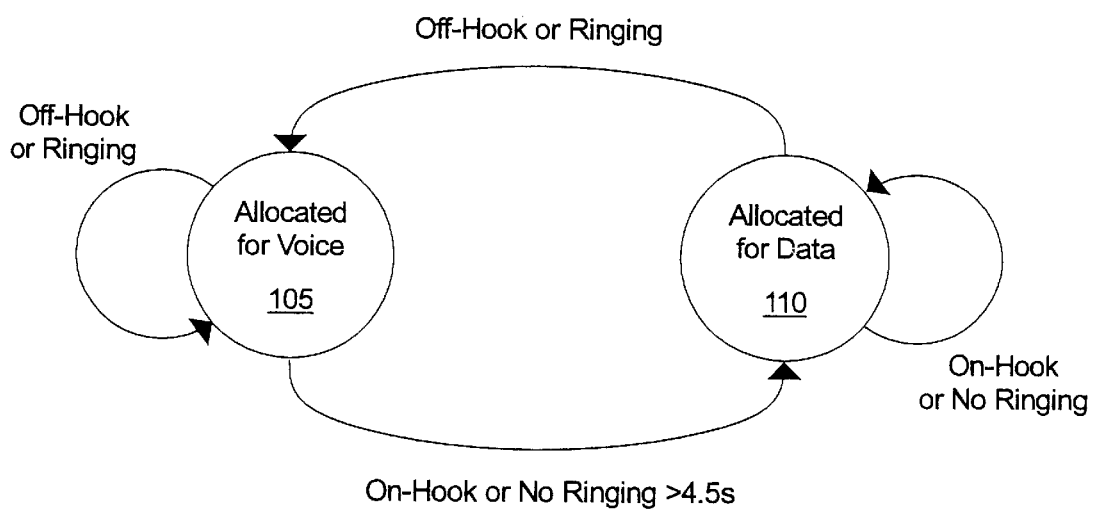
FIG. 1 is a state diagram showing a simplified example of states and conditions used to decide whether a transport channel should assume a first allocation status or a second allocation status.

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

The various embodiments utilize bit-level control of the bandwidth allocation in a channelized communication transport system, such as a transport system for voice and ATM (asynchronous transfer mode) services. The transport channels are preferably virtual channels such as separate time slices of a TDM (time division multiplexing) system, separate frequency subbands of an FDM (frequency division multiplexing) system, separate orthogonal coding signals of a CDM (code division multiplexing) system or separate wavelengths of a WDM (wavelength division multiplexing) system. However, it is recognized that the various traffic types alternatively may be allocated to discrete physical transport channels. The communication traffic can be carried across physical carriers appropriate to the type of transport channel chosen. Such physical carriers may include coaxial cable, copper twisted-pair, optical fiber or other physical carrier medium. The communication traffic may also be carried using a wireless carrier medium appropriate to the type of transport channel chosen. Examples may include RF (radio frequency) communications, microwave communications, IR (infrared) communications and other electromagnetic radiation communications.

As the invention is useful for multi-node communications, inter-node communications can use differing carrier types. One example is the use of copper twisted pair and TDM between a remote terminal and a first node and the use of optical fiber and WDM between the first node and a second node. The various embodiments are compatible with a variety of carrier types and framing protocols. A restriction is that the framing structure must support a method which maintains the relationship between the control channel and the message channel(s) in order to support transport across multiple nodes.

An example of a transport channel is one DS0 (digital signal level 0) channel of a T-type transport system. For North America, a T1 transport system contains 24 DS0 channels, a T2 transport system contains 96 DS0 channels and a T3 transport system contains 672 DS0 channels. A DS0 channel is commonly considered to be 64 Kbits per second, regardless of the transport system. For example, in a SONET (synchronous optical network) system, an OC-3 (optical carrier level 3) transport system can be thought of as 2,016 DS0 channels. Other channelized transport systems are known in the art.

Bandwidth allocation within the transport system is between a first traffic type, such as voice traffic, and a second traffic type, such as data traffic. Accordingly, a single status bit can be used to indicate whether the transport channel should have a first allocation status to transport the first traffic type or a second allocation status to transport the second traffic type.

For one embodiment, the transport system is designed to support dynamic allocation of bandwidth between voice service as the first traffic type and ATM data service as the second traffic type. For a further embodiment, the transport system can support x DS0s with DS0s reserved for voice data, such that $y \leq x$. When voice service is inactive, the DS0s reserved for voice can be used for ATM data. The bandwidth allocation is applied on a DS0 basis, such that some DS0s can be carrying voice data while other DS0s carry ATM data. The hardware monitors the status of the voice signaling in order to determine what type of data to send in each DS0. To avoid oscillations between a DS0 service assignment, a switch to voice service should generally be maintained for some minimum time period, such as a minimum of 15 seconds.

Switching between voice and data traffic, along with timing constraints, are typically dictated by industry standards. FIG. 1 is a simplified state diagram showing one example of states and conditions used to decide whether the DS0 or other transport channel should assume the first allocation status, i.e., allocated for voice, or the second allocation status, i.e., allocated for data, in a typical telecommunications system.

For the example shown in FIG. 1, a DS0 or other transport channel initially has the first allocation status, allocated for voice, in state 105. The DS0 will transition out of the first allocation status to the second allocation status, allocated for data, in state 110 if the subscriber line goes on-hook or if the line stops ringing for more than 4.5 seconds. As long as the line is ringing or the subscriber is off-hook, the DS0 will remain allocated for voice.

If the DS0 or other transport channel initially has the second allocation status, allocated for data in state 110, the DS0 will remain allocated to data as long as the subscriber is on-hook or no ringing is detected. If the subscriber goes off-hook or the ringing is detected, the DS0 will transition out of the second allocation status, state 110, to the first allocation status for voice, state 105.

It is noted that the state diagram of FIG. 1 is just a simplified example of the conditions that might trigger a transition between the first allocation status and the second allocation status. The invention, however, is not limited to a particular decision process for when a transport channel should carry the first traffic type and when it should carry the second traffic type.

Figure 2A:
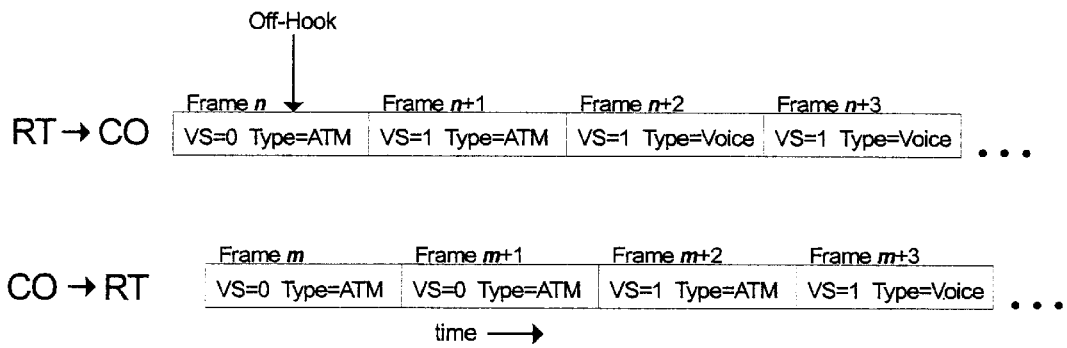
FIGS. 2A–2B are control flow diagrams showing the timing relationship between a status bit and the traffic type for a transport channel between two nodes of a transport system in accordance with the invention.
Figure 2B:
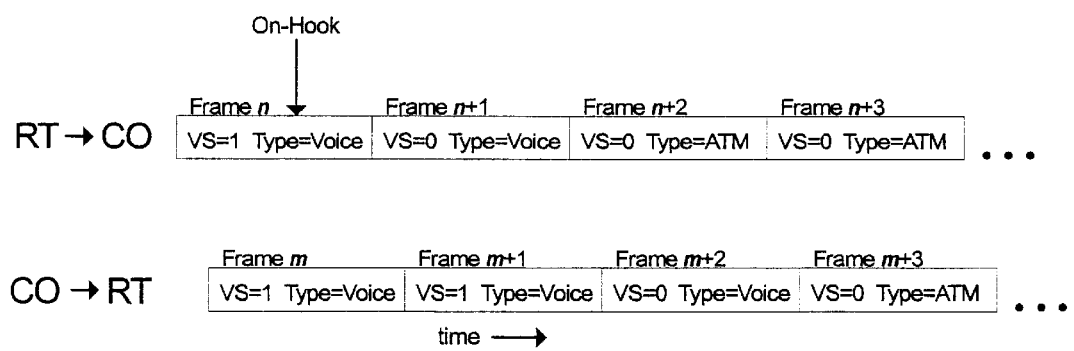

FIGS. 2A–2B are control flow diagrams showing the timing relationship between the status bit VS and the traffic type for a transport channel between two nodes of a transport system. For the example shown in FIGS. 2A–2B, the control flow diagrams are for communications between a remote terminal (RT) as a first node and a central office (CO) as a second node for both upstream traffic (RT to CO) and downstream traffic (CO to RT). FIG. 2A shows the control flow for a transition from data traffic to voice traffic while FIG. 2B shows the control flow for a transition from voice traffic to data traffic. The figures only show a single status bit and channel in each frame although a frame can contain multiple status bits and channels.

The status bit VS is a single data bit within a frame that is indicative of the desired allocation status of its corresponding transport channel. Each frame contains a sample of the channel traffic and its corresponding status bit. For one embodiment, each frame contains a sample of the channel traffic for each channel of the transport system along with at least one status bit for each channel for which dynamic allocation is permitted, i.e., each switched transport channel. For a further embodiment, each status bit is carried by a single dedicated transport channel or control channel within the frame. The status bit has a first logic level, e.g., logic 1, indicative of a desire to allocate the transport channel for the first traffic type and a second logic level, e.g., logic 0, indicative of a desire to allocate the transport channel for the second traffic type.

As shown in FIG. 2A, a decision is made to transition from data traffic to voice traffic for a switched transport channel at Frame n. For the example in FIG. 2A, the decision condition is the subscriber line corresponding to the transport channel going off-hook. The decision condition is irrelevant and it is merely necessary from some condition to be indicative of a desire to allocate the channel for voice traffic. In Frame n, the status bit VS initially has the second logic level, such as logic 0, corresponding to an ATM data traffic type. While FIG. 2A assumes that the RT detects the condition and acts as the master controller in changing the allocation status for both directions of transmission, the roles could be reversed with the CO detecting the decision condition. In addition, each side could autonomously control the allocation status which it transmits to the other side. Both the CO and RT could detect the signaling change and control their respective transmit status bits and traffic channels.

In the next subsequent frame, Frame n+1, the status bit VS is changed to the first logic level, such as logic 1, corresponding to a voice traffic type. For one embodiment, this change in the status bit VS indicates that the traffic type, and thus the allocation of the transport channel, will change in the next subsequent frame. While it is possible to simultaneously change the status bit and the traffic type of a frame, such would require buffering of the frame to allow the CO to properly route the transport channels of the incoming frame as either voice or ATM data. Alternatively, the change in the traffic type could be delayed some predetermined number of frames after the change in status bit information, e.g., changing the traffic type in Frame n+3, two frames after the change in status bit information, rather than the next subsequent frame, Frame n+2. While the protocol allows for a delay of any predetermined number of frames, it is recognized that the extra delay may fail to meet the timing requirements for activating the voice channel. Accordingly, the designer should take transition timing constraints into account when choosing a frame delay.

In Frame n+2 of FIG. 2A, the traffic type for the transport channel is changed from ATM data to voice. The traffic type from the RT to the CO for the transport channel will remain as voice traffic until a new condition is detected indicative of a desire to revert to ATM data traffic.

In a corresponding fashion, communication from the CO to the RT is initially ATM data with a status bit VS in the logic 0 state in Frame m when the off-hook condition is detected by the RT. Although the CO begins receiving Frame n+1 from the RT prior to sending Frame m+1 to the RT, it does not make a determination of the value of the transport channel's status bit VS prior to sending Frame m+1 to the RT. The CO thus maintains its status bit and traffic type in Frame m+1.

Prior to sending Frame m+2, the CO has received Frame n+1 from the RT and detects that the status bit VS has changed to the logic 1 state. Accordingly, the CO changes its status bit VS for the transport channel to the logic 1 state in Frame m+2. This echoing of the status bit value by the CO can both acknowledge to the RT that it is correctly recognizing the incoming traffic for the transport channel and that its next subsequent frame, or some later subsequent frame, will contain voice traffic. After notifying the RT that its transport channel's traffic type is changing, the CO transitions to voice traffic in Frame m+3 such that the change in channel allocation is complete in both directions.

The transition from voice traffic to data traffic in FIG. 2B proceeds similarly to the process described with reference to FIG. 2A. As shown in FIG. 2B, a decision is made to transition from voice traffic to data traffic for the switched transport channel at Frame n. For the example in FIG. 2B, the decision condition is the subscriber line corresponding to the transport channel going on-hook. The decision condition is irrelevant and it is merely necessary from some condition to be indicative of a desire to allocate the channel for data traffic. In Frame n, the status bit VS initially has the first logic level, e.g., logic 1, corresponding to the voice traffic type. While FIG. 2B assumes that the RT detects the condition and acts as the master controller in changing the allocation status for both directions of transmission, the roles could be reversed with the CO detecting the decision condition. In addition, each side could autonomously control the allocation status which it transmits to the other side. Both the CO and RT could detect the signaling change and control their respective transmit status bits and traffic channels.

In the subsequent frame, Frame n+1, the transport channel's status bit VS is changed to the second logic level, e.g., logic 0, corresponding to the ATM data traffic type. For one embodiment, this change in the status bit VS indicates that the traffic type, and thus the allocation of the transport channel, will change in the next subsequent frame. As with the change from data traffic to voice traffic, it is possible to simultaneously change the status bit and the traffic type within a frame or to delay the change of traffic type some predetermined number of frames after the change in status bit. Regardless of the timing, it is preferable that transitions between the first allocation status and the second allocation status for each switched transport channel utilize the same frame delay in both directions and for both transition types.

In Frame n+2 of FIG. 2B, the transport channel's traffic type is changed from voice to ATM data. The traffic type from the RT to the CO will remain as ATM data traffic until a new condition is detected indicative of a desire to revert to voice traffic.

In a corresponding fashion, communication from the CO to the RT is initially voice with a status bit VS in the logic 1 state in Frame m when the on-hook condition is detected by the RT. Although the CO begins receiving Frame n+1 from the RT prior to sending Frame m+1 to the RT, it does not make a determination of the value of the transport channel's status bit VS prior to sending Frame m+1 to the RT. The CO thus maintains its status bit and traffic type in Frame m+1.

Prior to sending Frame m+2, the CO has received Frame n+1 from the RT and detects that the status bit VS has changed to the logic 0 state. Accordingly, the CO changes its status bit VS to the logic 0 state in Frame m+2. This echoing of the status bit value by the CO can both acknowledge to the RT that it is correctly recognizing the incoming traffic for the transport channel and that its next subsequent frame, or some later subsequent frame, will contain ATM data traffic. After notifying the RT that its traffic type is changing, the CO transitions to ATM data traffic in Frame m+3 such that the change in channel allocation is complete in both directions.

Figure 3:
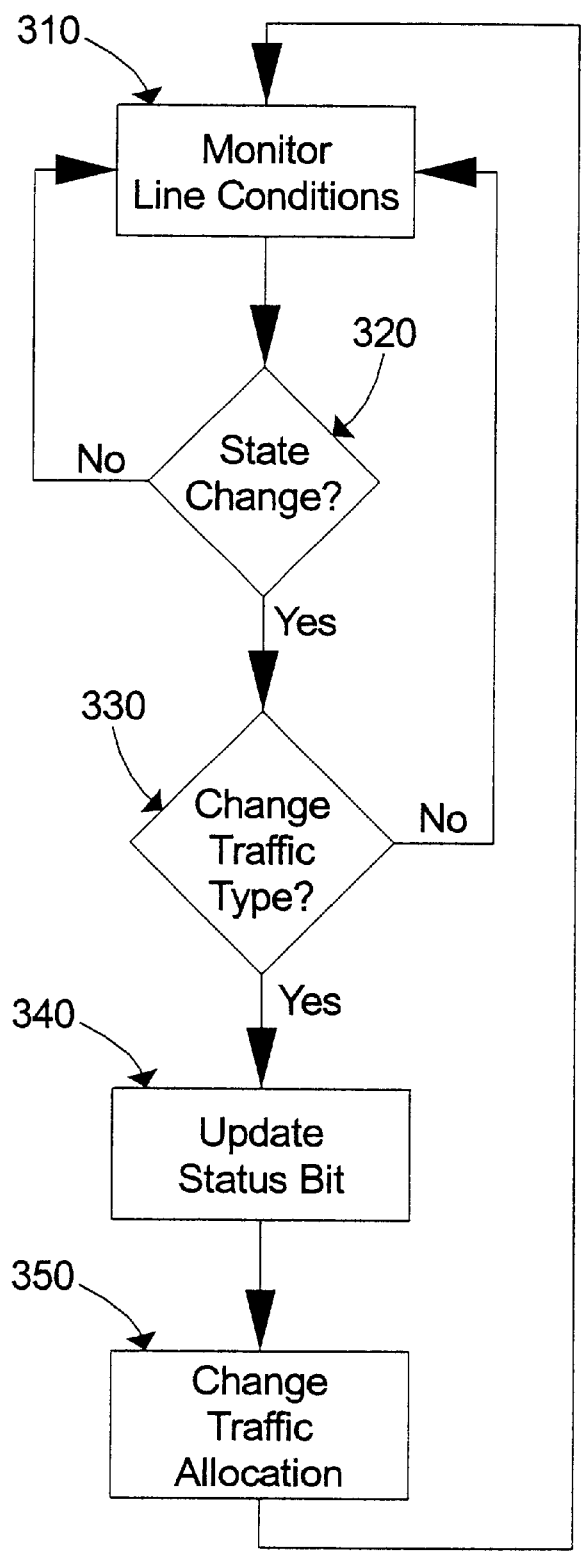
FIG. 3 is a process flowchart of one method of dynamically allocating bandwidth of a transport channel in accordance with the invention.

The process described with reference to FIGS. 2A–2B is more generally described with reference to FIG. 3. FIG. 3 is a process flowchart of one method of dynamically allocating bandwidth of a transport channel in accordance with the invention.

The line conditions are monitored in action box 310. Monitoring line conditions includes, for example, monitoring for an off-hook condition, monitoring for an on-hook condition, monitoring loop current feed, etc. The line conditions being monitored include at least one condition indicative of a desire to change the traffic allocation of the corresponding switched transport channel. For one embodiment, the line being monitored is a local loop of a telecommunications system.

The line conditions are evaluated for a state change in decision box 320. If no state change is detected, control is returned to action box 310. If a state change is detected in decision box 320, control is transferred to decision box 330.

In decision box 330, the state change is evaluated for a change in traffic type. A change in state may not, however, be indicative of a desire to change traffic allocation. Whether a change in state is indicative of a desire to change traffic allocation is dependent upon the previous state as more than one state may correspond to a given traffic type or allocation status. If no change in traffic type is desired in decision box 330, control is returned to action box 310. If, however, a change in traffic type is desired, control is transferred to action box 340. Note that if a change in state is always indicative of a desire to change traffic type, i.e., there is a one-to-one correspondence between state and desired traffic type, decision box 330 may be eliminated.

In action box 340, the status bit is changed or updated to indicate the desired traffic type for the transport channel. This change in the status bit preferably occurs in the next subsequent frame. Following the change in the status bit, the traffic allocation is changed in action box 350. This change in traffic allocation preferably occurs in the next subsequent frame following the change in the status bit. This process is repeated for each channel of the transport system for which dynamic bandwidth allocation is allowed.

One consideration with typical commercial transport systems is their bit error rates. In particular, T1 lines are notoriously known for their noisy transmission characteristics. Bit error rates as high as $10^{-4}$ are possible. While this error rate does not significantly degrade voice quality, it can have serious effects on data transmission. For example, the T1 transport system as described in Rustad et al. is designed to support dynamic allocation using the 'C' signaling bit. Assume that such a system is designed to support eight switched channels. With this system, eight switched channels can be dynamically assigned between voice traffic and data traffic. With eight switched channels, the eight 'C' bits used for control information are transmitted at a rate of 2.67 Kbits per second. With a $10^{-4}$ bit error rate and an information rate of 2.67 Kbits per second, an error will occur in the control channel every 3.7 seconds on average.

An error in the dynamic bandwidth control bit will cause either a byte to be extracted from the data channel or an extra byte to be inserted into the data channel. In a data protocol, the insertion or extraction of a byte will cause an error in the associated data packet. For some systems, a high bit error rate would be causing the loss of packets anyway, such that losing another packet due to an error in the bandwidth allocation control would not necessarily further degrade the performance of the data link. However, for ATM (asynchronous transfer mode) data protocols, such is not the case. ATM framing relies on cells having a fixed size, e.g., a fixed 53 bytes, with one cell immediately following another cell. For the example cell size, once framing is established, the ATM algorithm simply looks every 53 bytes to make sure the data is still framed. An error in the dynamic bandwidth allocation does not cause a simple corruption of a data byte, but rather causes either the insertion or deletion of a byte from the ATM channel. The insertion or deletion of a byte causes the ATM layer to fall out of frame, thereby causing a much larger disturbance than the corruption of a single packet.

Various embodiments of the invention mitigate the bit error problem by repeating the dynamic bandwidth control information several times over a predefined framing interval. The repetitive control information may further be spread across the framing interval so as to avoid problems with burst errors. For example, if typical burst errors tend to last less than 1 ms, repeating the status bit approximately every 1 ms within a frame will reduce the likelihood that a burst error would corrupt more than one occurrence of the status bit. The receiving end accumulates the repeated status bit information and uses a majority rule to determine how to allocate the switched channel, i.e., the most frequently occurring value of the status bit determines the desired allocation status. As an example, the transmitter could repeat the control bit seven times throughout a frame. The receiver would extract the seven bits of status information for each switched transport channel. With no bit errors, all seven status bits at the receiver will match and the allocation of each such channel is properly controlled. With a single bit error, six of the seven status bits will match and the receiver will properly control the allocation. In fact, using the example of seven status bits per framing interval, this approach will properly handle up to three bit errors in one framing interval. Note that the number of status bits repeated in a frame is preferably an odd number to avoid a no-decision condition, i.e., where the number of status bits having a first logic level equals the number of status bits having a second logic level.

Another problem with robbed-bit allocation schemes, such as the one proposed by Rustad et al., is that they rely on the redundant signaling information of the ESF framing mechanism. Such systems are thus incompatible with SF and TR-08 framing mechanisms. Various embodiments of the present invention use a separate channel for the dynamic bandwidth control. As such, the framing mechanism of the channel becomes irrelevant. For example, to carry the dynamic bandwidth control information across a T1 span, a DS0 can be reserved for the control function. This control DS0 can travel through the network without regard to the framing mechanism and multiplexing techniques used by the various nodes in the network. A restriction is that the framing structure must support a method which maintains the relationship between the control channel and the message channel(s) in order to support transport across multiple nodes.

The approach of providing a separate control channel further supports sending the control information beyond the local loop. Such approaches provide a technique that can travel across any TDM or other multiplexed node in the network. However, it is recognized that using a separate control channel results in a reduction in bandwidth availability. To improve the bandwidth efficiency, the control channel used to carry the dynamic bandwidth status bit information can also carry the signaling information for the switched channels. By carrying the signaling information in the control channel, the switched DS0s can support the full 64 Kbits per second of a DS0.

Figure 4:
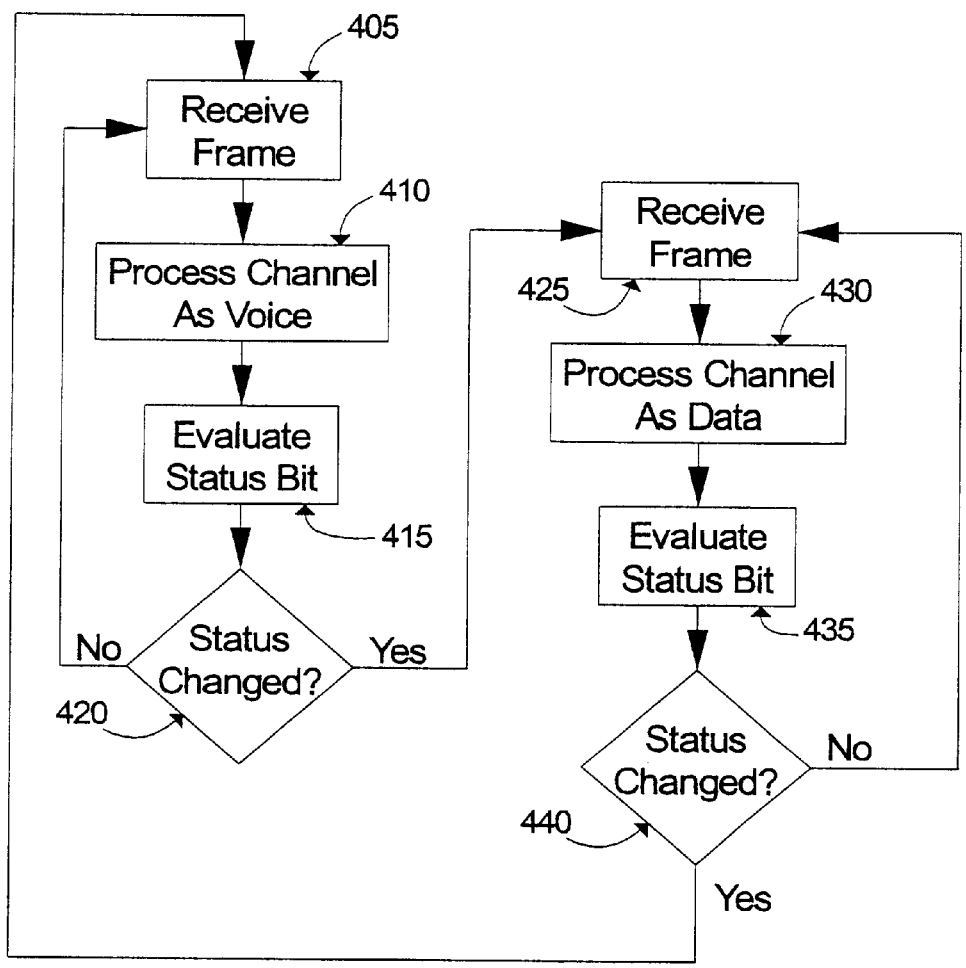
FIG. 4 is a process flowchart of one method of processing transport channel traffic in accordance with the invention.

FIG. 4 is a process flowchart of one method of processing the received transport channel traffic in accordance with the invention. The method described in FIG. 4 is applicable to both ends of the transport system, e.g., the remote terminal and the central office of FIGS. 2A–2B. The following description assumes that the transport channel is initially allocated for voice traffic at action box 405, but the process could apply equally to a transport channel initially allocated for data traffic by starting at action box 425. Processing of each switched channel is thus determined by its corresponding status bit information contained in a preceding frame, preferably the immediately preceding frame.

The method described in FIG. 4 is performed for each transport channel for which dynamic allocation is permitted or desired. A frame is received in action box 405 and the content of the frame corresponding to the transport channel, i.e., the sample of channel traffic, is processed as voice traffic in action box 410. The status bit or bits corresponding to the transport channel are extracted from the frame and the status bit information is evaluated to determine the desired allocation status in action box 415. The status bit or bits for each switched transport channel are contained in a transport channel distinct from each of the switched transport channels.

Where more than one status bit is used for each transport channel, a majority rule is preferably used to determine desired allocation status, i.e., the most frequently occurring value of status bits for a given transport channel determines the desired allocation status of that transport channel. Using a majority rule, and an odd number of status bits for each transport channel, simplifies the evaluation process for allocation status. Other evaluation processes may be used to determine desired allocation status, e.g., a super majority or total agreement of the status bits. However, such systems must rely on a default allocation status, i.e., a predetermined allocation status or the most recent allocation status, if the condition is not met.

If the allocation status is changed in decision box 420, control is transferred to action box 425 for the receipt of the next frame. If the allocation status remains the same in decision box 420, control is returned to action box 405 for receipt of the next frame.

At action box 430, the contents of the frame received in action box 425 and corresponding to the transport channel are processed as data traffic. The status bit or bits for the transport channel are extracted from the frame and the status bit information is evaluated to determine the desired allocation status in action box 435. If the allocation status is changed in decision box 440, control is transferred to action box 405 for the receipt of the next frame. If the allocation status remains the same in decision box 440, control is returned to action box 425 for receipt of the next frame.

For embodiments where the change in traffic type is delayed more than one frame, the conditions in decision boxes 420 and 440 are not met until both the change in desired allocation is detected and the predetermined number of frames have been received. Additionally, processing channel traffic and extracting/evaluating the status bit generally occur concurrently as the information is distributed throughout each frame. However, concurrent processing is not required.

Conclusion

Methods for bit-level control of dynamic bandwidth allocation are adapted for use in multi-node transport systems without regard to the framing mechanisms and multiplexing techniques used by the various nodes in the network. A single status bit is used to indicate the desired allocation status of each channel for which dynamic allocation is permitted or desired. The status bit has a first logic level indicative of a desire to have a first allocation status, such as allocated for data traffic, and a second logic level indicative of a desire to have a second allocation status, such as allocated for voice traffic. The status bit may be repeated multiple times within a frame to mitigate the effects of transmission errors. Spacing the repeated status bits within the frame further mitigates the effects of burst errors.

The status bit or bits for each switched transport channel are carried within a transport channel distinct from the switched transport channels. In this manner, their values can be maintained across node boundaries without regard to the framing mechanisms or multiplexing techniques used by the transport system. A restriction is that the framing structure must support a method which maintains the relationship between the control channel and the message channel(s) in order to support transport across multiple nodes. The various embodiments described herein thus permit dynamic bandwidth allocation beyond the local loop.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A method of dynamically allocating bandwidth in a multi-node transport system, the method comprising:

detecting a condition indicative of a desire to change an allocation status for a first transport channel of the transport system, wherein detecting the condition occurs during transmission of a first frame from a first node to a second node of the transport system;

updating a status bit in a second transport channel in a second frame for transmission from the first node to the second node; and changing the allocation status for the first transport channel in a third frame for transmission from the first node to the second node;

wherein each frame carries channel traffic for the first transport channel and the second transport channel.

2. The method of claim 1, wherein the second frame is the next subsequent frame following the first frame.

3. The method of claim 1, wherein the second frame is some predetermined number of frames following the first frame.

4. The method of claim 1, wherein the second frame and the third frame are the same frame.

5. The method of claim 1, wherein the third frame is the next subsequent frame following the second frame.

6. The method of claim 1, wherein the third frame is some predetermined number of frames following the second frame.

7. The method of claim 1, wherein the second transport channel is distinct from the first transport channel.

8. The method of claim 1, wherein the first node detects the condition indicative of a desire to change the allocation status of the first transport channel.

9. The method of claim 1, wherein the first node is a remote terminal and the second node is a central office in a telecommunications system.

10. The method of claim 1, wherein roles of the first node and the second node are reversed.

11. The method of claim 1, wherein the first allocation status is allocated for voice traffic and the second allocation status is allocated for data traffic.

12. The method of claim 11, wherein the data traffic is asynchronous transfer mode data traffic.

13. The method of claim 1, further comprising:

repeating the status bit within each frame.

14. A method of dynamically allocating bandwidth in a multi-node transport system having at least a first transport channel associated with a subscriber line and a second transport channel distinct from the first transport channel, the method comprising:

at a first node, detecting a subscriber line condition indicative of a desire to change an allocation status for the first transport channel in an upstream direction from the first node to a second node of the transport system, wherein detecting the subscriber line condition occurs during transmission of a first frame in the upstream direction;

updating status bit information in the second transport channel in a second frame for transmission in the upstream direction;

changing the allocation status for the first transport channel in a third frame for transmission in the upstream direction;

at the second node, evaluating the updated status bit information from the second frame in the upstream direction;

updating status bit information in the second transport channel in a fourth frame for transmission in a downstream direction from the second node to the first node; and changing the allocation status for the first transport channel in a fifth frame for transmission in the downstream direction.

15. A communications transport system for carrying a first traffic type and a second traffic type between a first node and a second node, the transport system comprising:

a carrier for transmitting frames between the first node and the second node, wherein the carrier has at least one first transport channel and a second transport channel distinct from each of the first transport channels and wherein each frame carries a sample of each of the first transport channels and the second transport channel;

wherein each frame carries a status bit in the second transport channel corresponding to each of the first transport channels;

wherein each status bit is indicative of a desired allocation status for its corresponding first transport channel; and wherein the desired allocation status is either allocated for the first traffic type or allocated for the second traffic type.

16. The communications transport system of claim 15, wherein each transport channel is uniquely identified within the frame.

17. The communications transport system of claim 15, wherein each transport channel is a DS0.

18. The communications transport system of claim 15, wherein the first traffic type is voice traffic and the second traffic type is data traffic.

19. The communications transport system of claim 18, wherein the data traffic is asynchronous transfer mode data traffic.

20. The communications transport system of claim 15, wherein an allocation status of a given first transport channel in a given frame is the same as the desired allocation status indicated by the status bit corresponding to the given first transport channel in a frame previous to the given frame.

21. The communications transport system of claim 15, wherein each status bit corresponding to a first transport channel is repeated multiple times in each frame.

22. The communications transport system of claim 21, wherein an allocation status of a given first transport channel in a given frame is the same as the desired allocation status indicated by each status bit corresponding to the given first transport channel in a frame previous to the given frame.

23. The communications transport system of claim 21, wherein each frame is 53 bytes and each status bit corresponding to a first transport channel is repeated seven times in each frame.

24. The communications transport system of claim 15, wherein the first node is a remote terminal and the second node is a central office of a telecommunications system.

25. The communications transport system of claim 15, wherein roles of the first node and the second node are reversed.

26. The communication transport system of claim 15, wherein each frame allows a relationship between the first transport channel and the second transport channel to be maintained across multiple nodes of a telecommunications network.

27. A method of processing channel traffic in a telecommunications transport system having at least one first transport channel and a second transport channel distinct from each of the first transport channels, the method comprising:
receiving a frame containing a sample of the channel traffic from each of the first transport channels and the second transport channel, wherein the second transport channel carries status bit information indicative of a desired allocation status for each of the first transport channels; and
processing the samples of the channel traffic from each of the first transport channels according to their desired allocation status indicated by the status bit information carried by the second transport channel in a preceding frame.

28. The method of claim 27, wherein the preceding frame is the immediately preceding frame.

29. The method of claim 27, wherein each transport channel is uniquely identified within the frame.

30. The method of claim 27, wherein each transport channel is a DS0.

31. A method of processing channel traffic in a telecommunications transport system having at least one first transport channel and a second transport channel distinct from each of the first transport channels, the method comprising:
receiving a first frame containing a first sample of the channel traffic from each of the first transport channels and the second transport channel, wherein the second transport channel carries status bit information indicative of a desired allocation status for each of the first transport channels;
processing the first samples of to channel traffic from each of the first transport channels according to their desired allocation status indicated by the status bit information carried by the second transport channel in an earlier received frame;
receiving a second frame containing a second sample of the channel traffic from each of the first transport channels and the second transport channel; and
processing the second samples of the channel traffic from each of the first transport channels according to their desired allocation status indicated by the status bit information carried by the second transport channel in the first frame.

32. A method of processing channel traffic in a telecommunication transport system having a first transport channel and a second transport channel distinct from the first transport channel, the method comprising:
receiving a first frame containing a first sample of the channel traffic from the first transport channel and the second transport channel, wherein the second transport channel carries status bit information indicative of a desired allocation status for the first transport channels and wherein the desired allocation stabs is selected from a group consisting of a first allocated status for a first traffic type and a second allocated status for a second traffic type;
processing the first sample of the channel traffic from the first transport channel as the first traffic type;
extracting the status bit information from the first frame;
evaluating the status bit information from the first frame;
receiving a second frame containing a second sample of the channel traffic from the first transport channel and the second transport channel;
processing the second sample of the channel traffic from the first transport channel as the first traffic type if the desired allocation status indicated by the status bit information extracted from the first frame is allocated for the first traffic type; and
processing the second sample of the channel traffic from the first transport channel as the second traffic type if the desired allocation status indicated byte status bit information extracted from the first frame is allocated for the second traffic type.

33. The method of claim 32, wherein the first traffic type is voice traffic and the second traffic type is data traffic.

34. The method of claim 32, wherein the status bit information in a sample of channel traffic from the second transport channel contains a plurality of status bits.

35. The method of claim 34, wherein evaluating the status bit information further comprises determining a most frequently occurring value of the plurality of status bits.

36. The method of claim 35, wherein the desired allocation status is allocated for the first traffic type when the most frequently occurring value of to plurality of status bits is a first logic level and the desired allocation status is allocated for the second traffic type when the most frequently occurring value of the plurality of status bits is a second logic level.

37. The method of claim 35, wherein the plurality of status bits is an odd number of status bits.

* * * * *